US009644872B2

United States Patent
Tanaka et al.

(10) Patent No.: US 9,644,872 B2
(45) Date of Patent: May 9, 2017

(54) HEAT PUMP SYSTEM, CONTROL DEVICE, TEMPERATURE ADJUSTMENT METHOD, AND PROGRAM

(75) Inventors: Kosuke Tanaka, Tokyo (JP); Hirofumi Koge, Tokyo (JP); Tomokazu Kawagoe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 430 days.

(21) Appl. No.: 14/353,558

(22) PCT Filed: Oct. 24, 2011

(86) PCT No.: PCT/JP2011/074466
§ 371 (c)(1),
(2), (4) Date: Apr. 23, 2014

(87) PCT Pub. No.: WO2013/061399
PCT Pub. Date: May 2, 2013

(65) Prior Publication Data
US 2014/0297057 A1  Oct. 2, 2014

(51) Int. Cl.
*G05D 23/00* (2006.01)
*F25B 29/00* (2006.01)
(Continued)

(52) U.S. Cl.
CPC ............ *F25B 29/003* (2013.01); *F24F 3/065* (2013.01); *F24F 11/008* (2013.01); *F25B 7/00* (2013.01);
(Continued)

(58) Field of Classification Search
CPC ........ F24F 3/14; F24F 3/44; F24F 3/65; F24F 11/008; F24D 3/12; F24D 3/18;
(Continued)

(56) References Cited

U.S. PATENT DOCUMENTS 5,142,877 A    9/1992  Shimizu
5,388,422 A *  2/1995  Hayashida ............. F24F 3/065
                                                      62/211
(Continued)

FOREIGN PATENT DOCUMENTS

EP  1 536 186 A1  6/2005
EP  1 950 504 A2  7/2008
(Continued)

OTHER PUBLICATIONS

Office Action mailed Apr. 16, 2015 in the corresponding CN application No. 201180074372.3 (partial English translation included).
(Continued)

*Primary Examiner* — Tuan Vu
(74) *Attorney, Agent, or Firm* — Posz Law Group, PLC

(57) ABSTRACT

The refrigerant discharged from a compressor is distributed based on the priorities set by the user in advance and the remaining refrigerant is further distributed based on the priorities. Thus, setting the priorities for indoor units according, for example, to the usage of work spaces and the like in an office building, the user can operate a heat pump system efficiently in accordance with the intended use. Furthermore, the remaining capacity of the outdoor unit is distribute to the remaining indoor units according to their priorities so that the indoor units are operated efficiently within the range of the cooling capacity of the outdoor unit.

12 Claims, 8 Drawing Sheets

(51) Int. Cl.
*G05D 23/19* (2006.01)
*F25B 13/00* (2006.01)
*F24F 3/06* (2006.01)
*F24F 11/00* (2006.01)
*F25B 7/00* (2006.01)

(52) U.S. Cl.
CPC ......... *F25B 13/00* (2013.01); *G05D 23/1917* (2013.01); *F25B 2313/0291* (2013.01); *F25B 2313/0292* (2013.01); *F25B 2313/0314* (2013.01); *F25B 2339/047* (2013.01); *F25B 2600/021* (2013.01); *F25B 2600/2513* (2013.01); *F25B 2700/1931* (2013.01); *F25B 2700/1933* (2013.01); *F25B 2700/21161* (2013.01); *Y02B 30/741* (2013.01)

(58) Field of Classification Search
CPC ........ F25B 13/00; F25B 49/02; F25B 29/003; F25B 2313/291
See application file for complete search history.

(56) References Cited

U.S. PATENT DOCUMENTS

| | | | | |
|---|---|---|---|---|
| 7,591,145 B1* | 9/2009 | Wiggs | ........................ | F24F 3/14 62/176.6 |
| 2005/0061027 A1* | 3/2005 | Hirakuni | .................. | F25B 13/00 62/527 |
| 2005/0252226 A1* | 11/2005 | Seefeldt | ..................... | F24D 3/12 62/238.7 |
| 2006/0230770 A1* | 10/2006 | Kitsch | ...................... | F25B 13/00 62/151 |
| 2008/0178615 | A1 | 7/2008 | Yoon et al. | |
| 2008/0179410 | A1 | 7/2008 | Yoon et al. | |
| 2010/0082162 A1* | 4/2010 | Mundy | .................... | F24F 3/044 700/277 |
| 2010/0243202 A1* | 9/2010 | Han | .......................... | F24D 3/18 165/62 |
| 2012/0222440 | A1 | 9/2012 | Matsui et al. | |
| 2013/0098086 A1* | 4/2013 | Sillato | ..................... | F25B 49/02 62/184 |

FOREIGN PATENT DOCUMENTS

| | | |
|---|---|---|
| EP | 1 950 507 A1 | 7/2008 |
| GB | 2 330 426 A | 4/1999 |
| JP | 03-282164 A | 12/1991 |
| JP | H07-180924 A | 7/1995 |
| JP | 09-236303 A | 9/1997 |
| JP | 2001-272114 A | 10/2001 |
| JP | 3242246 B2 | 12/2001 |
| JP | 2002-031421 A | 1/2002 |
| JP | 2005-156017 A | 6/2005 |
| WO | 2011/061792 A1 | 5/2011 |

OTHER PUBLICATIONS

Extended European Search Report dated Jun. 30, 2015 issued in corresponding EP patent application No. 11874826.8.
Office Action mailed Nov. 18, 2014 issued in corresponding JP patent application No. 2013-540525 (and English translation).
International Search Report of the International Searching Authority mailed Dec. 20, 2011 for the corresponding international application No. PCT/JP2011/074466 (and English translation).
Office Action dated Dec. 29, 2015 issued in corresponding CN patent application No. 201180074372.3 (and partial English translation).

* cited by examiner

TO HOT WATER DISPENSER

HEAT PUMP SYSTEM, CONTROL DEVICE, TEMPERATURE ADJUSTMENT METHOD, AND PROGRAM

CROSS REFERENCE TO RELATED APPLICATION

This application is a U.S. national stage application of International Application No. PCT/JP2011/074466 filed on Oct. 24, 2011, the disclosure of which is incorporated by reference.

TECHNICAL FIELD

The present disclosure relates to a heat pump system, control device, temperature adjustment method, and program.

BACKGROUND ART

In an air-conditioning system installed in a large construction such as an office building, multiple indoor units provided respectively on the floors or in the floor divisions are connected to an outdoor unit provided on the rooftop via refrigerant pipes. Thus, a heat pump conducting heat exchange between the indoor air and outdoor air is constructed.

In a multi-room air-conditioning system of the above kind, multiple indoor units are connected to a single outdoor unit in parallel. Therefore, the capacity (capability) of the outdoor unit is determined based on the total of the capacities (the total capacity) of the indoor units connected to the outdoor unit.

However, if the capacity of the outdoor unit is smaller than the total capacity of the indoor units, it is sometimes difficult to supply the refrigerant to the indoor units at flow rates requested by the indoor units. In such a case, for example, it is necessary to give priority in supply of the refrigerant to the indoor unit requesting the largest quantity of refrigerant and divide the remaining refrigerant among the remaining indoor units (for example, see Patent Literature 1).

CITATION LIST

Patent Literature

Patent Literature 1: Japanese Patent No. 3242246.

SUMMARY OF INVENTION

The device disclosed in the Patent Literature 1 gives priority in supply of the refrigerant to the indoor unit requesting the largest quantity of refrigerant. Therefore, the other indoor units are supplied with smaller quantities of refrigerant and some rooms may possibly be less comfortable.

Furthermore, when a cascade refrigerating cycle comprising multiple refrigerating cycles is configured between the outdoor unit and a temperature adjustment target, it is difficult to correct the heat quantity supplied to the temperature adjustment target upon change in the heat quantity requested by the temperature adjustment target.

The present disclosure is invented with the view of the above situation and an exemplary objective of the present disclosure is to efficiently adjust the temperature of a temperature adjustment target in accordance with the priority specified by the user.

TECHNICAL PROBLEM

Solution to Problem

In order to achieve the above objective, the heat pump system according to the present disclosure comprises:

multiple indoor units conducting heat exchange between a temperature adjustment target and a refrigerant;

an outdoor unit conducting heat exchange between the outdoor air and the refrigerant;

a first circulating system circulating the refrigerant between the multiple indoor units and the outdoor unit;

adjustment means provided to each of the indoor units for adjusting the quantity of refrigerant entering the indoor unit from the first circulating system;

input means for entering priorities set for the indoor units; and control means controlling the adjustment means and distributing the refrigerant so as to supply the indoor units with the refrigerant of the flow rates the indoor units need in the priority order of the indoor units from the highest when the total of refrigerant flow rates necessary at the multiple indoor units, which are obtained from temperature adjustment target temperatures of temperature adjustment targets of the multiple indoor units and the current temperatures of the temperature adjustment targets, surpasses the refrigerant flow rate that can be discharged into the first circulating system from the outdoor unit.

Advantageous Effects of Invention

With the present disclosure, for example, as the user enters priorities assigned to the indoor units, the refrigerant is distributed to the indoor units in accordance with the priorities. Then, the temperatures of temperature adjustment targets can be adjusted efficiently without making the user less comfortable.

DESCRIPTION OF EMBODIMENTS

«Embodiment 1»

Figure 1:
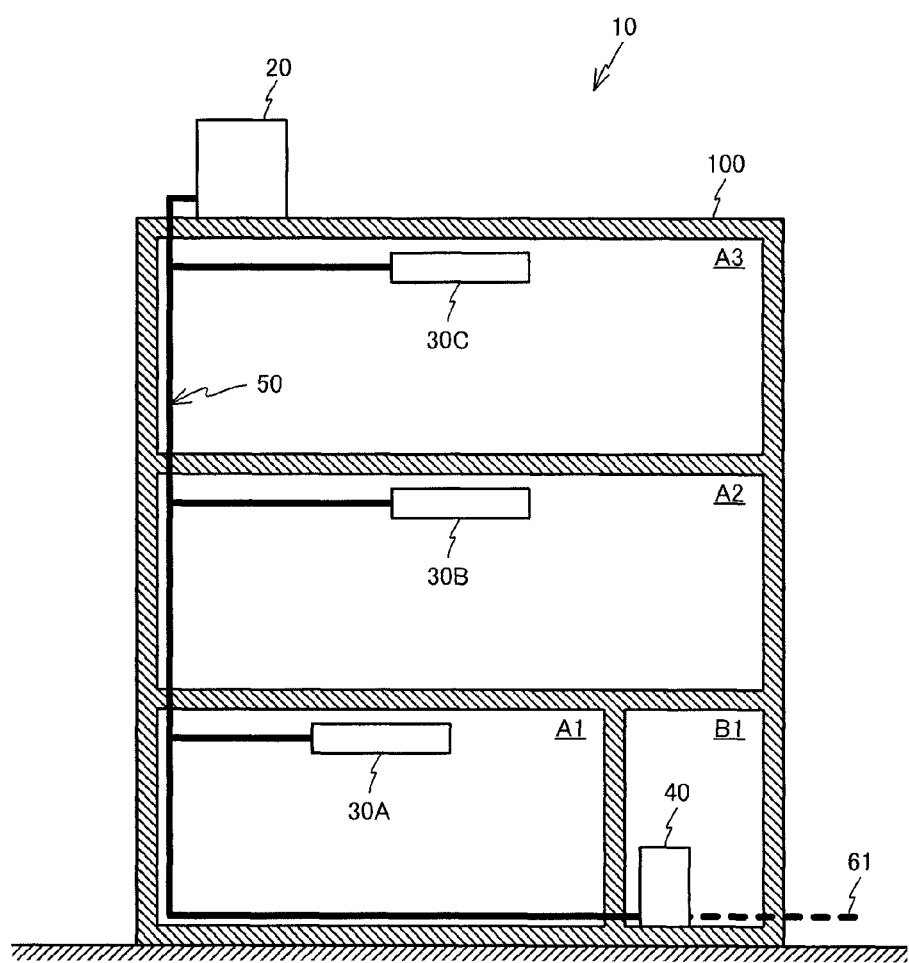
FIG. 1 is a block diagram of the heat pump system according to Embodiment 1.

Embodiment 1 of the present disclosure will be described hereafter with reference to the drawings. FIG. 1 is a block diagram of a heat pump system 10 installed in an office building 100 by way of example. The office building 100 has three work spaces A1, A2, and A3 and a kitchen B1. The heat pump system 10 has indoor units 30A to 30C installed in the work spaces A1 to A3 and an indoor unit 40 installed in the kitchen B1 of the office building 100, and an outdoor unit 20 installed on the rooftop of the office building 100. The indoor units 30A to 30C and 40 are connected to the outdoor unit 20 via a circulating system 50 circulating the refrigerant.

Figure 2:
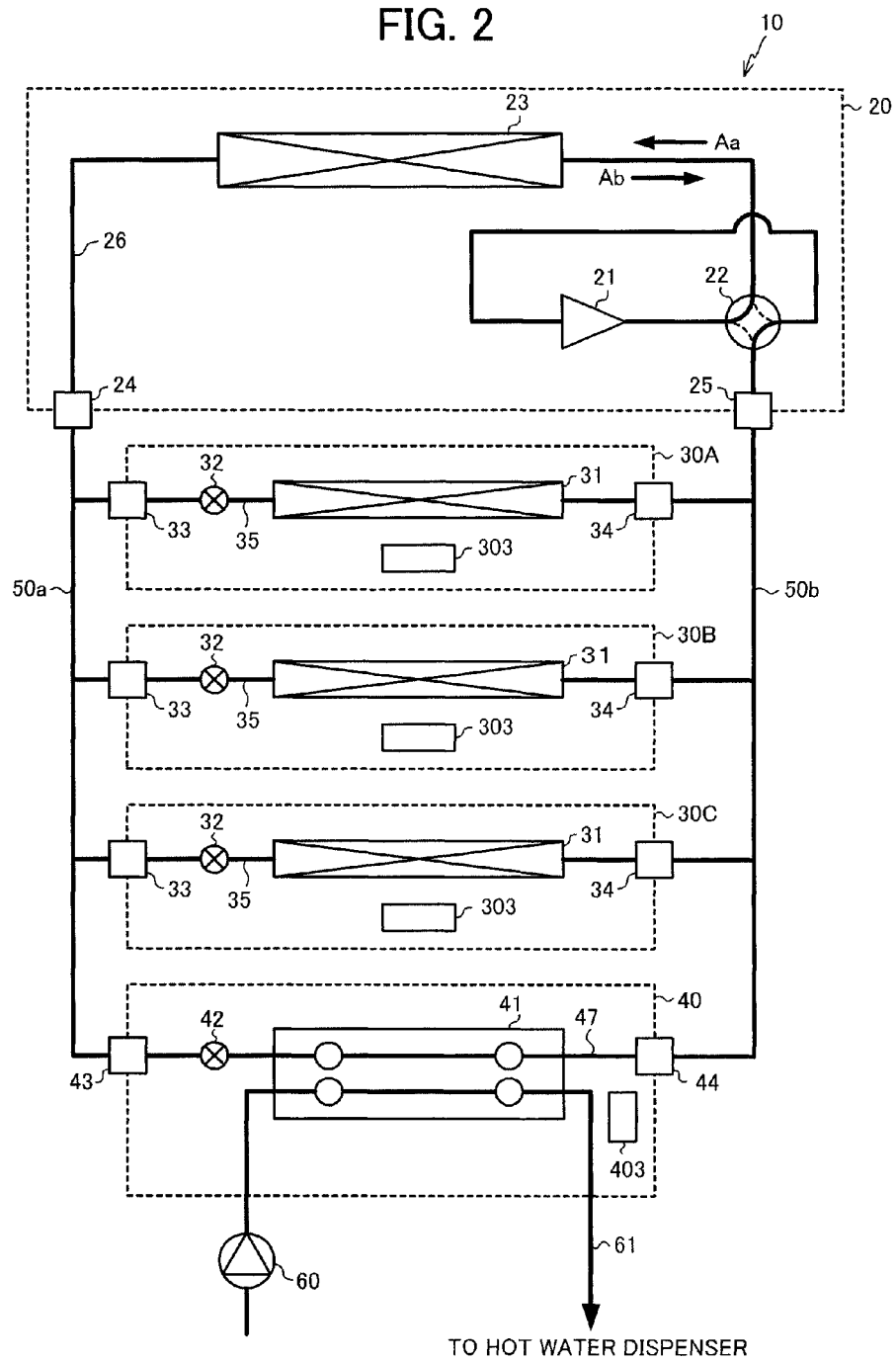
FIG. 2 is a block diagram showing the pipeline of the heat pump system.

FIG. 2 is a diagram showing the pipeline of the heat pump system 10. As shown in FIG. 2, the outdoor unit 20 has a heat exchanger 23, a compressor 21, and a four-way valve 22. These components are connected via a refrigerant pipe 26.

The heat exchanger 23 is, for example, a cross fin type fin and tube heat exchanger having a heat transfer tube, a heat-releasing fin, and an electric fan cooling the heat-releasing fin. The heat exchanger 23 functions as a condenser when the heat pump system 10 is in cooling operation and as an evaporator when the heat pump system 10 is in heating operation.

The compressor 21 is, for example, a capacitive compressor comprising an inverter motor. The compressor 21 compresses the refrigerant and discharges the refrigerant to the four-way valve 22.

The four-way valve 22 is a valve to switch the direction of the refrigerant running through the heat exchanger 23. The four-way valve 22 is switched to circulate the refrigerant in the arrowed direction Aa when the heat pump system 10 is in cooling operation, and to circulate the refrigerant in the arrowed direction Ab when the heat pump system 10 is in heating operation. Here, chlorofluorocarbon R410A is used as the refrigerant.

The outdoor unit 20 having the above configuration is installed on the rooftop of the office building 100 as shown in FIG. 1, and conducts heat exchange between the refrigerant supplied via the circulating system 50 as the first circulating system and the outdoor air.

The indoor unit 30A is a device for cooling or heating the indoor air as a temperature adjustment target. As shown in FIG. 2, the indoor unit 30A has a heat exchanger 31 and an expansion valve 32. The heat exchanger 31 and expansion valve 32 are connected in series by a refrigerant pipe 35.

The heat exchanger 31 has a configuration equivalent to the above-described heat exchanger 23. The heat exchanger 23 conducts heat exchange between the refrigerant running through the heat exchanger 23 and the indoor air.

The expansion valve 32 is an electric expansion valve functioning as adjustment means for adjusting the flow rate of the refrigerant running through the heat exchanger 31. The expansion valve 42 comprises, for example, a valve and a stepping motor adjusting the degree of opening of the valve.

The indoor unit 30A having the above configuration is installed, for example, on the ceiling of the work space A1 of the office building 100 as shown in FIG. 1. Then, the indoor unit 30A conducts heat exchange between the refrigerant supplied via the circulating system 50 and the air in the work space A1.

The indoor units 30B and 30C have a configuration equivalent to the above-described indoor unit 30A. The indoor units 30B and 30C are installed on the ceilings of the work spaces A2 and A3 of the office building 100, respectively. The indoor units 30B and 30C conduct heat exchange between the refrigerant supplied via the circulating system 50 and the air in the work spaces A2 and A3, respectively.

The indoor unit 40 is a device for cooling or heating the tap water as a temperature adjustment target. As shown in FIG. 2, the indoor unit 40 has a heat exchanger 41 and an expansion valve 42. The heat exchanger 41 and expansion valve 42 are connected in series by the refrigerant pipe 35.

The heat exchanger 41 is a plate-type heat exchanger. The heat exchanger 41 conducts heat exchange between the tap water running through the heat exchanger 41 by means of a water-supply pump 60 and the refrigerant.

The expansion valve 42 is an electronic expansion valve for adjusting the flow rate of the refrigerant running through the heat exchanger 41. The expansion valve 42 comprises, for example, a valve and a stepping motor adjusting the degree of opening of the valve.

The indoor unit 40 having the above configuration is installed in the kitchen B1 of the office building 100 as shown in FIG. 1. Then, the indoor unit 40 conducts heat exchange between the refrigerant supplied via the circulating system 50 and the tap water running through a water pipe 61. Thus, for example, the tap water running into a hot water dispenser from the water pipe 61 is preheated.

As shown in FIG. 2, the refrigerant pipes 50a and 50b constituting the circulating system 50 and the refrigerant pipe 26 constituting the outdoor unit 20 are connected by joints 24 and 25. Furthermore, the refrigerant pipes 50a and 50b and the refrigerant pipes 35 constituting the indoor units 30A to 30B are connected by joints 33 and 34. Furthermore, the refrigerant pipes 50a and 50b constituting the circulating system 50 and the refrigerant pipe 47 constituting the indoor unit 40 are connected by joints 43 and 44. Thus, a heat pump type refrigerating cycle is constituted in which the indoor units 30A to 30C and indoor unit 40 are connected to the outdoor unit 20 in parallel.

Figure 3:
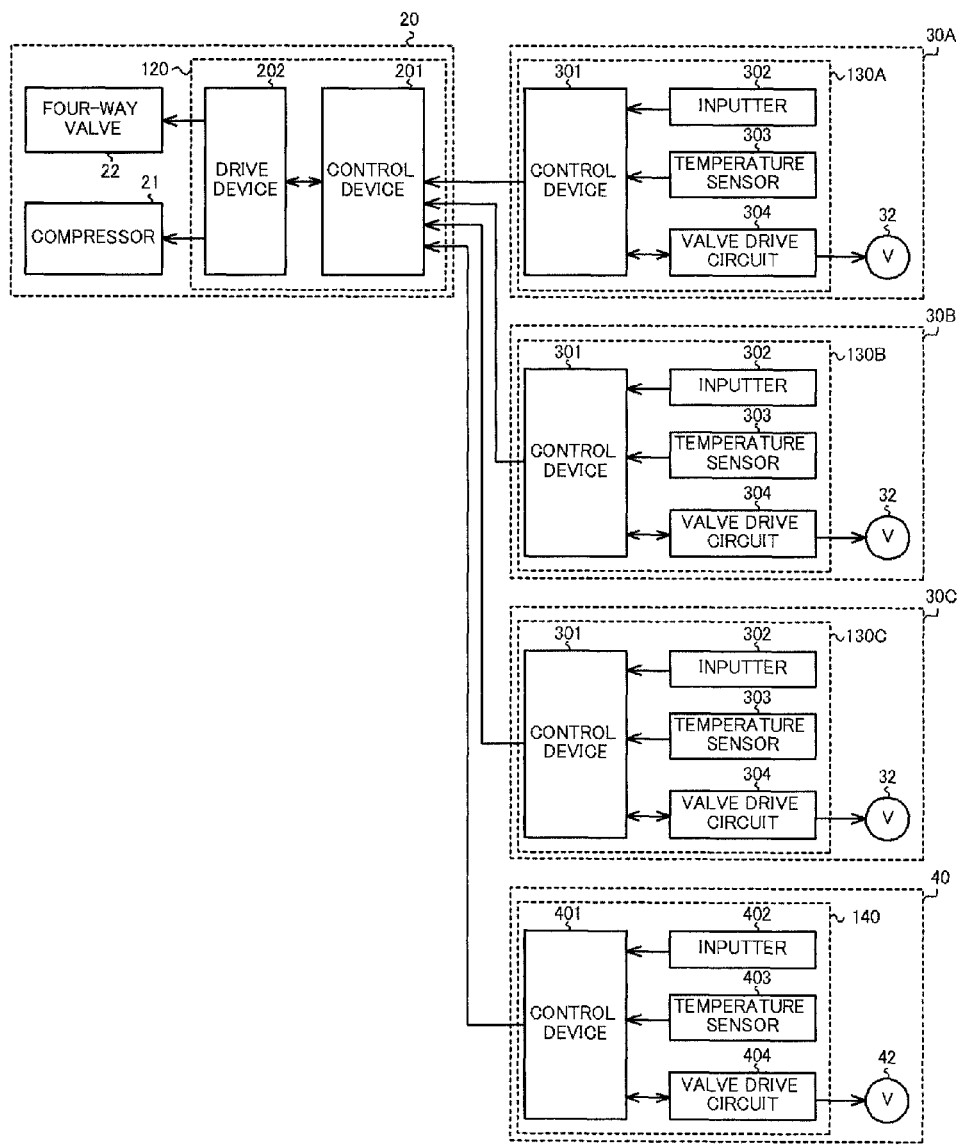
FIG. 3 is a block diagram showing the control system of the heat pump system.

FIG. 3 is a block diagram showing the control system of the heat pump system 10. As shown in FIG. 3, the outdoor unit 20 of the heat pump system 10 has an outdoor control unit 120.

The outdoor control unit 120 communicates with the indoor units 30A to 30C and 40 and acquires a priority $P(n)$ and information presenting a requested quantity $Q$ (requested quantity information), which will be described later, from the indoor units 30A to 30C and 40. Then, the outdoor control unit 120 drives the compressor 21 according to the acquired requested quantity information. The outdoor control unit 120 has a control device 201 and a drive device 202.

Figure 4:
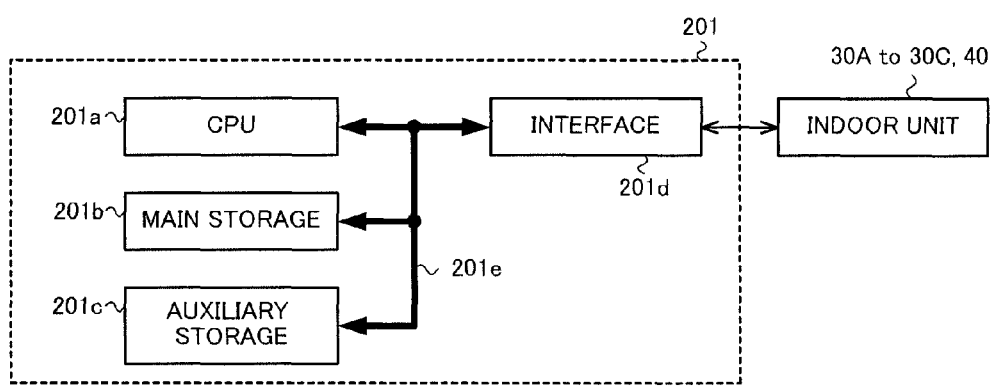
FIG. 4 is a block diagram of the control device.

FIG. 4 is a block diagram of the control device 201. As shown in FIG. 4, the control device 201 is a microcomputer having a CPU (central processing unit) 201a, a main storage 201b, an auxiliary storage 201c, an interface 201d, and a bus 201e connecting these components to each other.

The main storage 201b has a volatile memory such as a DRAM (dynamic random access memory) or SRAM (static random access memory). The main storage 201b is used as the work area of the CPU 201a.

The auxiliary storage 201c has a nonvolatile memory such as a magnetic disc or flash memory. The auxiliary storage 201c stores programs executed by the CPU 201a and information regarding various parameters.

The interface 201d is configured with, for example, a serial interface. The CPU 201a communicates with the indoor units 30A to 30C and 40 via the interface 201d.

Returning to FIG. 3, the drive device 202 has an inverter circuit for driving the inverter motor of the compressor 21 and a drive circuit for driving the four-way valve 22. The drive device 202 applies a drive voltage of which the frequency f is modulated based on instruction from the control device 201 to the inverter motor constituting the compressor 21. Thus, the inverter motor constituting the compressor 21 rotates at a rotation speed corresponding to the frequency f. Furthermore, the drive device 202 drives the four-way valve 22 based on instruction from the control device 201 to switch the direction of the refrigerant running through the heat exchanger 23 to the arrowed direction Aa or to the arrowed direction Ab.

As shown in FIG. 3, the indoor unit 30A has an indoor control unit 130A. The indoor control unit 130A is a device to control the expansion valve 32 of the indoor unit 30A so as to adjust the flow rate of the refrigerant running through the heat exchanger 31. The indoor control unit 130A has a control device 301, an inputter 302, a temperature sensor 303, and a valve drive circuit 304.

The inputter 302 is, for example, a remote control device installed on a wall of the work space A1. The inputter 302 has a GUI (graphical user interface) comprising a liquid crystal display and touch panel or an interface comprising input keys. The user can enter various kinds of information into the control device 301 via the inputter 302. Examples of information entered into the control device 301 include set temperatures, information presenting the airflow rate from the indoor unit 30A, and information presenting the priority P (n) of the indoor unit 30A that is described later with regard to the work space A1.

The priority P (n) can be entered by numbers. For example, if there are three levels of priority, an indoor unit given a priority "3" has the highest priority, an indoor unit given a priority "2" has the second highest priority, and an indoor unit given a priority "1" has the lowest priority. In this embodiment, the priorities given to the indoor units are as follows by way of example.

TABLE 1

| 30A | 30B | 30C | 30D |
|-----|-----|-----|-----|
| 3   | 2   | 2   | 1   |

The temperature sensor 303 is a sensor for detecting the temperature of the air entering the heat exchanger 31 by means of an electric fan. The temperature sensor 303 can be, for example, a thermistor of which the resistance value changes in accordance with the temperature. The control device 301 measures the resistance value of the temperature sensor 303 so as to measure the temperature of the air entering the electric fan, namely the room temperature of the work space A1.

Receiving instruction from the control device 301, the valve drive circuit 304 drives the stepping motor of the expansion valve 32 to adjust the degree of opening of the expansion valve 32, thus adjusting the flow rate of the refrigerant running through the heat exchanger 31.

The control device 301 has, like the control device 201 of the outdoor control unit 120, a CPU, a main storage, an auxiliary storage, and an interface. The control device 301 obtains the refrigerant flow rate necessary at the indoor unit 30A from information entered by the user via the inputter 302 and the room temperature of the work space A1 that is measured by the temperature sensor 303. This flow rate means the refrigerant flow rate necessary for the indoor unit 30A to implement an expected performance.

The necessary refrigerant flow rate can be obtained by, for example, multiplying the difference $(T_i-T_r)$ between a set temperature $T_i$ set by the user and the measured room temperature $T_r$ by a unique coefficient a1 determined for each indoor unit. Obtaining the refrigerant flow rate a1 $(T_i-T_r)$ necessary at the indoor unit 30A, the control device 201 outputs information presenting the obtained flow rate to the outdoor unit 20.

Furthermore, the control device 301 obtains the degree of opening of the expansion valve 32 based on information from the control device 201 of the outdoor unit 20.

The degree of opening of the expansion valve 32 can be obtained by, for example, multiplying a supply quantity V by a unique coefficient a2 determined for each indoor unit provided that V is the supply quantity of refrigerant supplied from the control device 201 to the indoor unit 30A. The control device 201 adjusts the degree of opening of the expansion valve 32 to a2·V via the valve drive circuit 304.

The indoor units 30B and 30C have indoor control units 130B and 130C. The indoor control units 130B and 130C are each a device to control the expansion valve 32 of the indoor unit 30B or 30C to adjust the flow rate of the refrigerant running through the heat exchanger 31. Like the above-described indoor control unit 130A, the indoor control units 130B and 130C have a control device 301, an inputter 302, a temperature sensor 303, and a valve drive circuit 304. The indoor control units 130B and 130C function like the indoor control unit 130A.

The indoor unit 40 has an indoor control unit 140. The indoor control unit 140 is a device to control the expansion valve 42 to adjust the flow rate of the refrigerant running through the heat exchanger 41. The indoor control unit 140 has a control device 401, an inputter 402, and a temperature sensor 403.

The inputter 402 has an interface comprising, for example, a dial or push buttons provided on the enclosure of the indoor unit 40. The user can enter into the control device 401 supplied hot-water temperatures and information presenting the priority P (n) of the indoor unit 30A described later via the inputter 402.

The temperature sensor 403 is a sensor for detecting the temperature of the tap water after heat exchange with the refrigerant. The temperature sensor 303 is provided on the water pipe 61 connected to the secondary side (discharge side) of the heat exchanger 41. The temperature sensor 403 can be, for example, a thermistor of which the resistance value changes in accordance with the temperature. The control device 401 measures the resistance value of the temperature sensor 403 to measure the temperature (water temperature) of the tap water after passing through the heat exchanger 41.

Receiving instruction from the control device 401, a valve drive circuit 404 drives the stepping motor of the expansion valve to adjust the degree of opening of the expansion valve 42, thus adjusting the flow rate of the refrigerant running through the heat exchanger 31.

Like the outdoor control unit 120 and indoor control units 130A to 130C, the control device 401 has a CPU, a main storage, an auxiliary storage, and an interface. The control device 401 obtains the refrigerant flow rate necessary at the indoor unit 40 from information entered by the user via the inputter 402 and the water temperature measured by the temperature sensor 403. Then, the control device 401 outputs information presenting the obtained flow rate to the outdoor unit 20. Furthermore, the control device 401 obtains the degree of opening of the expansion valve 42 based on instruction from the control device 201 of the outdoor unit 20. Then, the control device 401 adjusts the degree of opening of the expansion valve 42 via the valve drive circuit 404.

Figure 5:
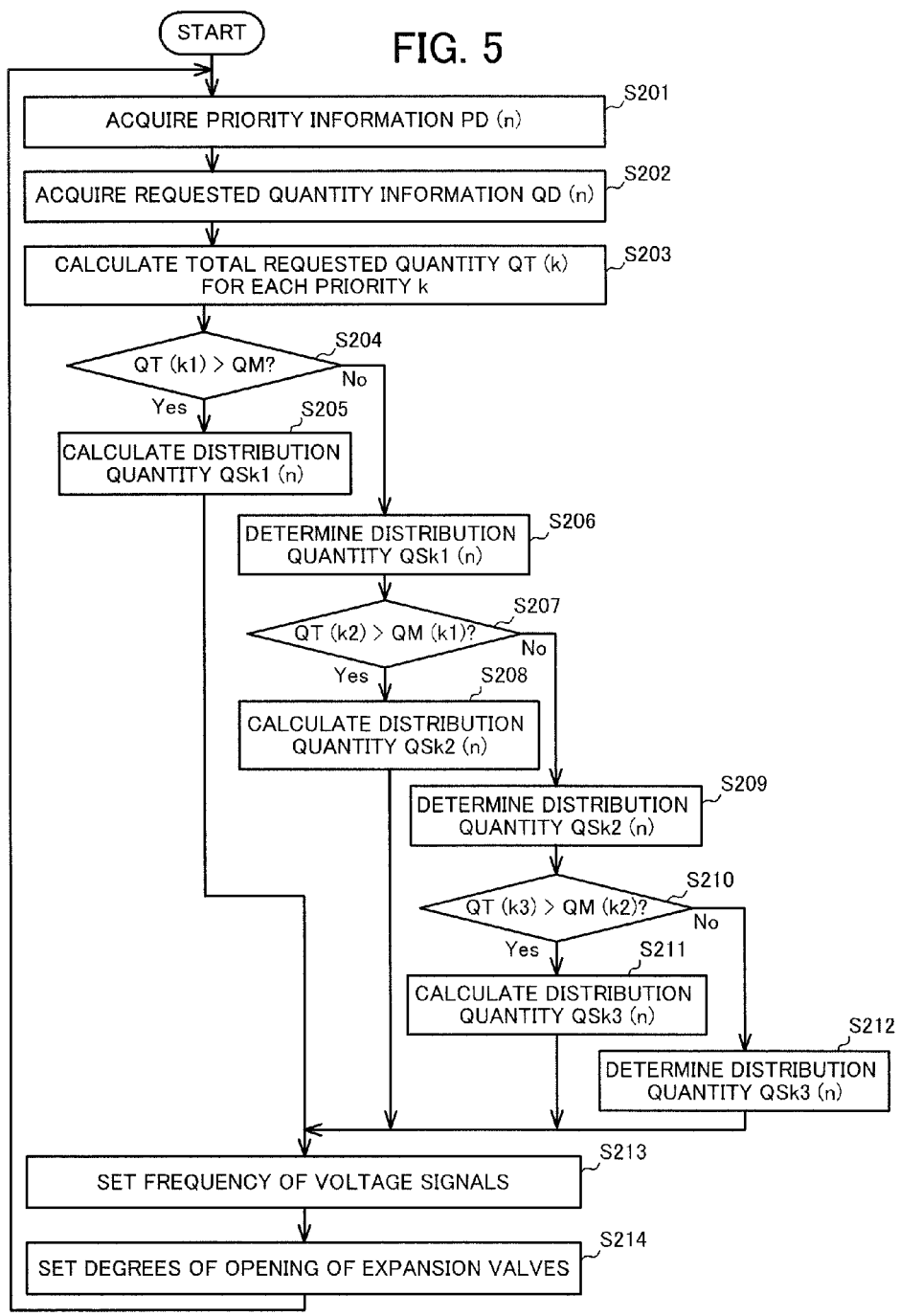
FIG. 5 is a flowchart showing a series of processing executed by the control device.

Operation of the heat pump system 10 having the above-described configuration will be described hereafter. The heat pump system 10 operates as the control devices 301 and 401 of the indoor units 30A to 30C and 40 cooperate based on instruction from the control device 201 of the outdoor unit 20. FIG. 5 is a flowchart showing a procedure executed by the control device 201 after the outdoor unit 20 is powered on.

For using the heat pump system 10, the user can specify set temperatures $T_i$ (n) of the indoor units 30A to 30C and 40 by operating the inputters 302 and 402 of the indoor units 30A to 30C and 40. When there is no input of set temperatures from the user, the set temperatures $T_i$ (n) are set to initial values. Furthermore, the user can specify priorities P (n) for the indoor units 30A to 30C and 40 by operating the inputters 302 and 402 of the indoor units 30A to 30C and 40. The set temperatures $T_i$ (n) and priorities P (n) entered by the user are retrieved and stored by the control devices 301 and 401.

As the heat pump system 10 starts operating, the control device 201 acquires priority information PD (n) presenting the priorities P (n) from the control devices 301 and 401 of the indoor units 30A to 30C and 40 in the first Step S201. Here, n is determined by the number of indoor units 30A to 30C and 40, and presents an integer from 1 to 4 in this case. The priority information PD (1) to PD (4) presents priority information of the indoor units 30A to 30C and 40, respectively.

The priority P (n) presents a rank in priority of the indoor unit, which is presented by three numbers 1 to 3 in this embodiment. The priority P (n) is higher in ranking as the number is higher. For example, an indoor unit having a priority P (n) of "3" has priority in supply of the refrigerant over an indoor unit having a priority P (n) of "2" or "1." The user can enter a value of the priority P (n) into the control devices 301 and 401 via, for example, the inputters 302 and 402 of the indoor units 30A to 30C and 40.

In the next Step S202, the control device 201 acquires requested quantity information QD (n) presenting requested quantities Q (n) from the control devices 301 and 401 of the indoor units 30A to 30C and 40. In this embodiment, the requested quantity information QD (1) to QD (4) presents requested quantity information of the indoor units 30A to 30C and 40, respectively.

The requested quantity Q (n) is the refrigerant flow rate necessary at an indoor unit that is obtained by the control devices 301 and 401 of the indoor units 30A to 30C and 40 as described above. For example, the requested quantity Q (n) is equivalent to the quantity per minute (L/min) of refrigerant running through an indoor unit.

In the next Step S203, the control device 201 calculates the total requested quantity QT (k) for each value k (k=1 to 3) of the priorities P (n). The total requested quantity QT (k) is, as presented by the expression (1) below, the sum of requested quantities $Q_k$ (n) from the indoor units having a priority P (n) of a value k.

$$QT(k)=\Sigma Q_k(n) \tag{1}$$

For example, if the value k of the priority P (1) of the indoor unit 30A is "3," the value k of the priority P (2) of the indoor unit 30B is "2," the value k of the priority P (3) of the indoor unit 30C is "2," and the value k of the priority P (4) of the indoor unit 40 is "1," the control device 201 obtains $Q_3$ (1) as the total requested quantity QT (3) for the priority value of "3." Additionally, the control device 201 obtains $Q_2$ (2)+$Q_2$ (3) as the total requested quantity QT (2) for the priority value of "2." Furthermore, the control device 201 obtains $Q_1$ (4) as the total requested quantity QT (1) for the priority value of 1.

The following explanation will be made on the assumption that the value k of the priority P (1) of the indoor unit 30A is "3," the value k of the priority P (2) of the indoor unit 30B is "2," the value k of the priority P (3) of the indoor unit 30C is "2," and the value k of the priority P (4) of the indoor unit 40 is "1."

In the next Step S204, the control device 201 compares the total requested quantity QT (k1) for the highest priority value k1 with the maximum quantity (maximum flow rate) QM per minute of the refrigerant discharged from the compressor 21. More specifically, the control device 201 compares the total requested quantity QT (3) for the highest priority value of "3" with the maximum quantity QM. Then, if the total requested quantity QT (3) is larger than the maximum quantity QM (Step S204: Yes), the control device 201 proceeds to the next Step S205.

In the Step S205, as presented by the expression (2) below, the control device 201 divides the maximum quantity QM in proportion of the ratio of the requested quantities $Q_{k1}$ (n) from the indoor units having a priority value k1 to calculate the distribution quantities $QS_{k1}$ (n) to the indoor units having a priority P (n) of a value k1. Furthermore, the control device 201 sets the distribution quantities $QS_k$ (n) to the remaining units to zero.

$$QS_{k1}(n)=QM \times (Q_{k1}(n)/QT(k1)) \tag{2}$$

In the Step S205, the priority value k1 is "3." Therefore, the distribution quantity $QS_3$ (1) of the refrigerant to be distributed to the indoor unit 30A can be obtained by substituting the requested quantity $Q_3$ (1) from the indoor unit 30A and the total requested quantity QT (3) for the priority value k of "3" in the above expression (2). Here, in the Step S205, only one indoor unit has the priority value k of "3." Therefore, the maximum quantity QM of the refrigerant discharged from the compressor 21 and the distribution quantity $QS_3$ (1) to the indoor unit 30A are equal.

On the other hand, if the total requested quantity QT (k1) is equal to or smaller than the maximum quantity QM in the Step S204 (Step S204: No), the control device 201 proceeds to the next Step S206.

In the Step S206, the control device 201 determines quantities equal to the requested quantities $Q_{k1}$ (n) from the indoor units having a priority value k1 to be the distribution quantities $QS_{k1}$ (n) to those indoor units. In the Step S206, a quantity equal to the requested quantity $Q_3$ (1) from the indoor unit 30A having the priority value of "3" is the distribution quantity $QS_3$ (1) to the indoor unit 30A.

In the next Step S207, the control device 201 compares the total requested quantity QT (k2) for the second highest priority value k2 (=k1−1) with the remaining quantity QM (k1) after the total requested refrigerant quantity QT (k1) already distributed is subtracted from the maximum quantity QM. Then, if the total requested quantity QT (k2) is larger than the remaining quantity QM (k1) (Step S207: Yes), the control device 201 proceeds to the next Step S208.

In the Step S208, as presented by the expression (3) below, the control device 201 divides the remaining quantity QM (k1) in proportion of the ratio of the requested quantities $Q_{k2}$ (n) from the indoor units having the priority value k2 to calculate the respective distribution quantities $QS_{k2}$ (n) to those indoor units. Furthermore, the control device 201 sets the distribution quantities $QS_k$ (n) to the remaining indoor units to zero.

$$QS_{k2}(n)=QM(k1) \times (Q_{k2}(n)/QT(k2)) \tag{3}$$

In the Step S208, the priority value k2 is "2." Therefore, the distribution quantity $QS_2$ (2) of the refrigerant to be distributed to the indoor unit 30B can be obtained by substituting the remaining quantity QM (k1), the requested quantity $Q_2$ (2) from the indoor unit 30B, and the total requested quantity QT (2) for the priority value k of "2" in the above expression (3). Furthermore, the distribution quantity $QS_2$ (3) of the refrigerant to be distributed to the indoor unit 30C can be obtained by substituting the remaining quantity QM (2), the requested quantity $Q_2$ (3) from the indoor unit 30C, and the total requested quantity QT (2) for the priority value k of "2" in the above expression (3).

For example, if the maximum quantity QM is "10," the requested quantity $Q_3$ (1) from the indoor unit 30A is "6," the requested quantity $Q_2$ (2) from the indoor unit 30B is "3," the requested quantity $Q_2$ (3) from the indoor unit 30B is "4," the total requested quantity QT (3) is "6." Then, the remaining quantity QM (2) is "4 (=QM−QT (3))." Furthermore, the total requested quantity QT (2) (=$Q_2$ (2)+$Q_2$ (3)) is "7."

Thus, the distribution quantity $QS_2$ (2) to the indoor unit 30B is "12/7" as a result of substituting "4" for the remaining quantity QM (k1), "7" for the total requested quantity QT (k2), and "3" for $Q_{k2}$ (n) in the above expression (3). Similarly, the distribution quantity $QS_2$ (3) to the indoor unit 3C is "16/7" as a result of substituting the values.

Consequently, the distribution quantities $QS_3$ (1), $QS_2$ (2), and $QS_2$ (3) to the indoor units 30A, 30B, and 30C are obtained as shown in the table below.

TABLE 2

| $QS_3$ (1), | $QS_2$ (2), | $QS_2$ (3) |
|---|---|---|
| 6 | 12/7 | 16/7 |

On the other hand, if the total requested quantity QT (k2) is equal to or smaller than the remaining quantity QM (k1) in the Step S207 (Step S207: No), the control device 201 proceeds to the next Step S209.

In the Step S209, the control device 201 determines quantities equal to the requested quantities $Q_{k2}$ (n) from the indoor units having a priority value k2 to be the distribution quantities $QS_{k2}$ (n) to those indoor units. In the Step S209, a quantity equal to the requested quantity $Q_2$ (2) from the indoor unit 30B having the priority value of "2" is the distribution quantity $QS_2$ (2) to the indoor unit 30B. Furthermore, a quantity equal to the requested quantity $Q_2$ (3) from the indoor unit 30C is the distribution quantity $QS_2$ (3) to the indoor unit 30C.

In the next Step S210, the control device 201 compares the total requested quantity QT (k3) for the lowest priority value k3 (=k2−1) with the remaining quantity QM (k2) after the total requested quantities QT (k1) and QT (k2) of the refrigerant already distributed is subtracted from the maximum quantity QM. Then, if the total requested quantity QT (k3) is larger than the remaining quantity QM (k2) (Step S210: Yes), the control device 201 proceeds to the next Step S211.

In the Step S211, as presented by the expression (4) below, the control device 201 divides the remaining quantity QM (k2) in proportion of the ratio of the requested quantities $Q_{k3}$ (n) from the indoor units having a priority value k3 to calculate the distribution quantities $QS_{k3}$ (n) to those indoor units. Furthermore, the control device 201 sets the distribution quantities $QS_k$ (n) to the remaining indoor units to zero.

$$QS_{k3}(n)=QM(k2)\times(Q_{k3}(n)/QT(k3)) \quad (4)$$

In the Step S211, the priority value k3 is "1." Therefore, the distribution quantity $QS_3$ (4) of the refrigerant to be distributed to the indoor unit 40 can be obtained by substituting the remaining quantity QM (k2), the requested quantity $Q2_{K3}$ (3) from the indoor unit 40, and the total requested quantity QT (1) for the priority value k of "1" in the above expression (4).

For example, when the maximum quantity QM is "10," the requested quantity $Q_3$ (1) from the indoor unit 30A is "3," the requested quantity $Q_2$ (2) from the indoor unit 30B is "2," the requested quantity $Q_2$ (3) from the indoor unit 30B is "4," and the requested quantity $Q_1$ (4) from the indoor unit 40 is "7," the total requested quantity QT (3) is "3" and the total requested quantity QT (2) is "6." Then, the remaining QM (1) is "1 (=QM−QT (3)−QT (2))." Furthermore, the total requested quantity QT (1) (=$Q_1$ (4)) is "7."

Then, the distribution quantity $QS_1$ (4) to the indoor unit 40 is "1" as a result of substituting "1" for the remaining quantity QM (k2), "7" for the total requested quantity QT (k3), and "7" for $Q_{k2}$ (n) in the above expression (4). Here, the remaining quantity QM (k2) is all distributed to the indoor unit 40. Therefore, the remaining quantity QM (k2) and distribution quantity $QS_1$ (4) are equal.

Consequently, the distribution quantities $QS_3$ (1), $QS_2$ (2), $QS_2$ (3), and $QS_1$ (4) to the indoor units 30A, 30B, 30C, and 40 are obtained as shown in the table below.

TABLE 3

| $QS_3$ (1), | $QS_2$ (2), | $QS_2$ (3) | $QS_1$ (4) |
|---|---|---|---|
| 3 | 2 | 4 | 1 (=7/7) |

On the other hand, if the total requested quantity QT (k3) is equal to or smaller than the remaining quantity QM (k2) in the Step S210 (Step S210: No), the control device 201 proceeds to the nest Step S212.

In the Step S212, the control device 201 determines quantities equal to the requested quantities $Q_{k3}$ (n) from the indoor units having a priority value k3 to be the distribution quantities $QS_{k3}$ (n) to those indoor units. In the Step S212, a quantity equal to the requested quantity $Q_1$ (4) from the indoor unit 40 having the priority value of "1" is the distribution quantity $QS_1$ (4) to the indoor unit 30B.

After completing the processing in the Step S205, S208, S211, or S212, the control device 201 proceeds to Step S213.

In the Step S213, the control device 201 sets a drive voltage frequency f for driving the compressor 21. When the determinations are affirmative in the Steps S204, S207, and S210, the total of the requested quantities Q (n) from the indoor units 30A to 30C and 40 is larger than the maximum quantity QM of the refrigerant discharged from the compressor 21. Therefore, if the determinations are affirmative in the Steps S204, S207, and S210, the control device 201 sets the drive voltage frequency f to a frequency equal to the rated frequency of the compressor 21. Consequently, the compressor 21 operates with the rated maximum output.

On the other hand, when the determinations are all negative in the Steps S204, S207, and S210, the maximum quantity QM of the compressor 21 is larger than the total of the requested quantities Q (n) from the indoor units 30A to 30C and 40. In such a case, the control device 201 sets the drive voltage frequency f so that the compressor 21 discharges the refrigerant in a quantity equal to the sum of the requested quantities Q (n) from the indoor units 30A to 30C and 40.

After setting the drive voltage frequency f, the control device 201 outputs information presenting the frequency f to the drive device 202. Consequently, the drive device 202 applies the drive voltage of the frequency f to the compressor 21. At the compressor 21, the inverter motor constituting the compressor 21 rotates at a rotation speed proportional to the frequency f. The compressor 21 discharges the refrigerant in a quantity corresponding to the requests from the indoor units.

In the next Step S214, the control device 201 sets the degrees of opening R1 to R4 of the expansion valves 32 and 42 constituting the indoor units 30A to 30C and 40. The degrees of opening R1 to R4 of the expansion valves 32 and 42 are set in accordance with the distribution quantities $QS_k$ (n) to the indoor units that are obtained in the processing of the Steps S201 to S213.

For example, when the determination is affinitive in the Step S204, the total of the distribution quantities $QS_{k1}$ (n) to the indoor units having a priority value k1 surpasses the maximum quantity QM of the compressor 21. In such a case, the control device 201 sets the degrees of opening of the expansion valves of the indoor units having the priority value k1 to the degrees of opening corresponding to the requested quantities requested by those indoor units. Then, the control device 201 sets the degrees of opening of the expansion valves of the remaining indoor units to zero.

More specifically, the control device 201 sets the degree of opening R1 of the expansion valve 32 of the indoor unit 30A in accordance with the requested quantity Q (1) and sets the degrees of the opening R2 to R4 of the expansion valves 32 and 42 of the remaining indoor units 30B, 30C, and 40 to zero.

After setting the degrees of opening of the expansion valves 32 and 42, the control device 201 notifies the control devices 301 and 401 of the indoor units 30A to 30C and 40 of the setting results. Consequently, the expansion valve 32 of the indoor unit 30A is opened to a desired degree of opening and the expansion valves 32 and 42 of the indoor units 30B, 30C, and 40 are completely closed. Consequently, the indoor unit 30A having the highest priority is supplied with the refrigerant corresponding to the requested quantity.

When the determination is affirmative in the Step S207, the total of the distribution quantities $QS_{k1}$ (n) to the indoor units having a priority value k1 and distribution quantities $QS_{k2}$ (n) to the indoor units having a priority value k2 surpasses the maximum quantity QM of the compressor 21. In such a case, the control device 201 sets the degrees of opening of the expansion valves of the indoor units having the priority values k1 and k2 to the degrees of opening corresponding to the requested quantities requested by those indoor units. Then, the control device 201 sets the degrees of opening of the expansion valves of the remaining indoor units to zero.

More specifically, the control device 201 sets the degrees of opening R1 to R3 of the expansion valves 32 of the indoor units 30A, 30B, and 30C in accordance with the requested quantities Q (1), Q (2), and Q (3) and sets the degree of opening R4 of the expansion valve 42 of the remaining indoor unit 40 to zero.

After setting the degrees of opening of the expansion valves 32 and 42, the control device 201 notifies the control devices 301 and 401 of the indoor units 30A to 30C and 40 of the setting results. Consequently, the indoor units 30A to 30C are supplied with the refrigerant corresponding to the requested quantities.

When the determination is affirmative in the Step S210, the total of the distribution quantities $QS_{k1}$ (n) to the indoor units having a priority value k1, distribution quantities $QS_{k2}$ (n) to the indoor units having a priority value k2, and distribution quantities $QS_{k3}$ (n) to the indoor units having a priority value k3 surpasses the maximum quantity QM of the compressor 21. In such a case, the control device 201 sets the degrees of opening of the expansion valves of the indoor units having the priority values k1, k2, and k3 to the degrees of opening corresponding to the requested quantities requested by those indoor units. Then, the control device 201 sets the degrees of opening of the expansion valves of the remaining indoor units to zero.

More specifically, the control device 201 sets the degrees of opening R1 to R4 of the expansion valves 32 and 42 of the indoor units 30A, 30B, 30C, and 40 in accordance with the requested quantities Q (1), Q (2), Q (3), and Q (4). In the above-described case, there is no remaining unit. However, if there are any units other than the indoor units 30A to 30C and 40, the control device 201 sets the degrees of opening of the expansion valves of those remaining units to zero.

After setting the degrees of opening of the expansion valves 32 and 42, the control device 201 notifies the control devices 301 and 401 of the indoor units 30A to 30C and 40 of the setting results. Consequently, the indoor units 30A to 30C and 40 are supplied with the refrigerant corresponding to the requested quantities.

On the other hand, when the determination is negative in the Step S210, the total of the distribution quantities $QS_{k1}$ (n) to the indoor units having a priority value k1, distribution quantities $QS_{k2}$ (n) to the indoor units having a priority value k2, and distribution quantities $QS_{k3}$ (n) to the indoor units having a priority value k3 is equal to or smaller than the maximum quantity QM of the compressor 21. In such a case, the control device 201 sets the degrees of opening of the expansion valves of the indoor units having the priority values k1, k2, and k3 to the degrees of opening corresponding to the requested quantities requested by those indoor units.

More specifically, the control device 201 sets the degrees of opening R1 to R4 of the expansion valves 32 and 42 of the indoor units 30A, 30B, 30C, and 40 in accordance with the requested quantities Q (1), Q (2), Q (3), and Q (4).

After setting the degrees of opening of the expansion valves 32 and 42, the control device 201 notifies the control devices 301 and 401 of the indoor units 30A to 30C and 40 of the setting results. Consequently, the indoor units 30A to 30C and 40 are supplied with the refrigerant corresponding to the requested quantities.

As described above, in this embodiment, the refrigerant discharged from the compressor 21 is distributed based on the priorities set by the user in advance and the remaining refrigerant is further distributed based on the priorities. Therefore, setting the priorities for the indoor units 30A to 30B and 40 in accordance with, for example, the usage of the work spaces A1 to A3 and kitchen B1 in the office building 100, the user can operate the heat pump system 10 efficiently in accordance with the intended use.

More specifically, setting the priorities for the work spaces in accordance with the frequency of use or importance, the user can operate the indoor unit of a work space requiring a high air-conditioning workload at the rated capacity even if the total of the maximum cooling capacities of the indoor units surpasses the maximum cooling capacity of the outdoor unit. Furthermore, the indoor unit of a work space where the air conditioning is highly necessary can be operated at the rated capacity. Consequently, it is assured that the work space is comfortable.

Furthermore, the remaining capacity of the outdoor unit is distributed to the remaining indoor units according to their priorities. The indoor units can be operated efficiently within the range of the cooling capacity of the outdoor unit.

In the above embodiment, the heat pump system 10 comprises three indoor units 30A to 30C conducting heat exchange between the refrigerant and indoor air and one indoor unit 40 conducting heat exchange between the refrigerant and tap water. This is not restrictive. The heat pump system 10 can comprise four or more indoor units conducting heat exchange between the refrigerant and indoor air. Furthermore, the heat pump system 10 can comprise multiple indoor units conducting heat exchange between the refrigerant and tap water.

In the above embodiment, three levels of priority are set for the indoor units. This is not restrictive. Two levels of priority can be set for the indoor units. In such a case, the Steps S209 to S211 in FIG. 5 are eliminated.

Alternatively, when four or more levels of priority are set for the indoor units, a series of processing corresponding to the Steps S206 to S208 or to the Steps S209 to S211 is executed before the processing of Step S212 to calculate the distribution quantities in accordance with the priorities.

« Embodiment 2 »

Figure 6:
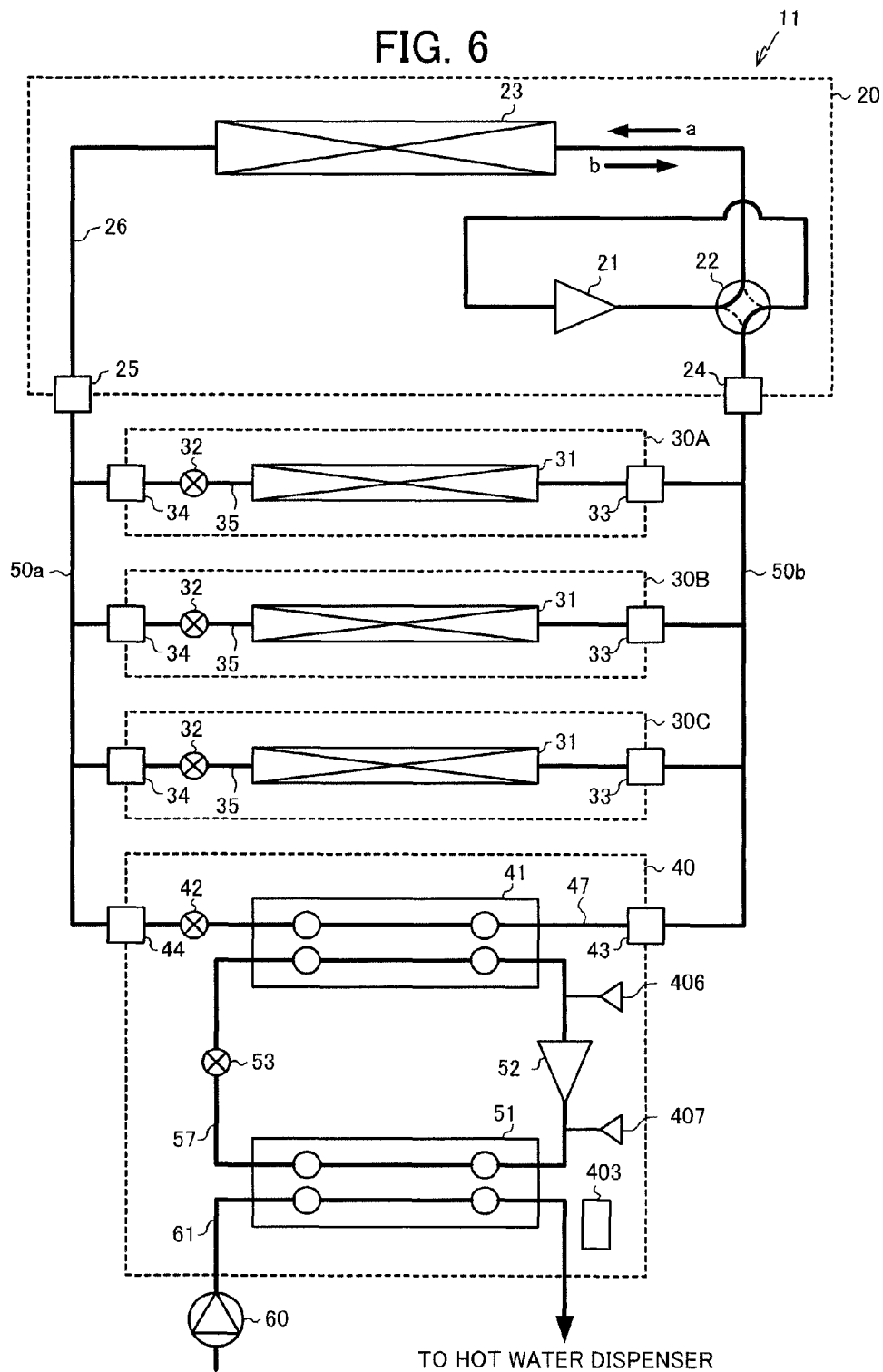
FIG. 6 is a block diagram of the heat pump system according to Embodiment 2.

Embodiment 2 of the present disclosure will be described hereafter with reference to the drawings. Here, the components that are the same as or equivalent to those in Embodiment 1 are referred to by the equivalent reference numbers. FIG. 6 is a diagram showing a heat pump system 11 according to Embodiment 2. As shown in FIG. 6, the heat pump system 11 is different from the heat pump system 10 according to Embodiment 1 in that the indoor unit 40 has a secondary refrigerating cycle.

As shown in FIG. 6, the indoor unit 40 comprises heat exchangers 41 and 51, a compressor 52, and expansion valves 42 and 53. The heat exchangers 41 and 51, expansion valve 53, and compressor 52 are connected in series by a refrigerant pipe 57, constituting the secondary refrigerating cycle. The heat pump system 11 overall comprises a two-tier cascade refrigerating cycle. Here, for example, chlorofluorocarbon R134a having a high critical temperature is used as the refrigerant for the secondary refrigerating cycle In the secondary refrigerating cycle having the above configuration, the heat exchanger 41 functions as the vaporization heat source of the secondary refrigerating cycle while the primary refrigerating cycle constituted by the outdoor unit 20, circulating system 50, and heat exchanger 41 of the indoor unit 40 is used in heating operation. The refrigerant circulating the refrigerant pipe 57 is heated to the condensation temperature after passing through the heat exchanger 41. In the heat exchanger 51, heat exchange occurs between the refrigerant heated to the condensation temperature and the tap water circulating a water pipe 61. Thus, the tap water is heated to hot water.

Figure 7:
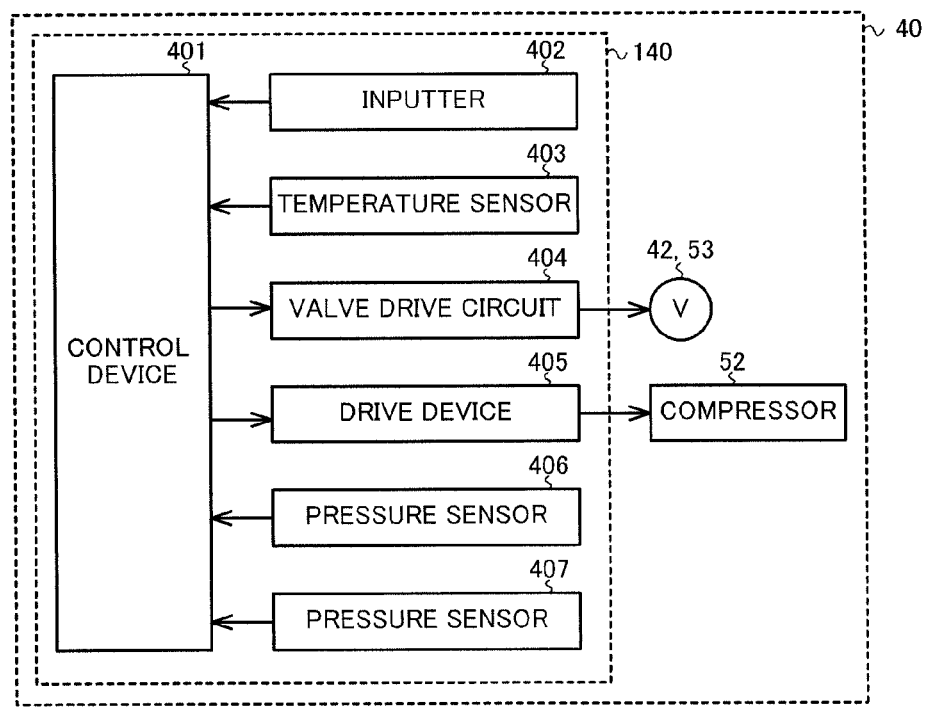
FIG. 7 is a block diagram showing the control system of an indoor unit.

FIG. 7 is a block diagram of the indoor unit 40 constituting the heat pump system 11. As shown in FIG. 7, the indoor unit 40 comprises a drive device 405 driving the compressor 52, a pressure sensor 406 detecting the pressure of the refrigerant entering the compressor 52, and a pressure sensor 407 detecting the pressure of the refrigerant leaving the compressor 52.

The drive device 405 has a configuration equivalent to the drive device 202 described in Embodiment 1. The drive device 405 drives the compressor 52 based on instruction from the control device 401.

In this embodiment, the control device 401 monitors the temperature of the tap water after heat exchange with the refrigerant in the heat exchanger 51 using a temperature sensor 403. Then, the control device 401 controls the output of the compressor 52 and the degree of opening of the expansion valve 53 so that the temperature of the tap water reaches a desired temperature. The compressor 52 is controlled by, for example, changing the frequency f of the drive voltage applied to the compressor 52.

For heating the tap water to a desired temperature, the refrigerant in a quantity corresponding to the heat quantity should be supplied from the outdoor unit 20 to the heat exchanger 41 of the indoor unit 40. The heat quantity HQ1 the heat exchanger 41 needs can be obtained by, as presented by the expression (5) below, subtracting the input W of the compressor 52 from the heat quantity HQ2 used by the indoor unit 40 for supplying hot water.

$$HQ1=HQ2-WD \quad (5)$$

Using the coefficient of performance COP of the secondary refrigerating cycle, the above expression (5) can be rewritten as follows.

$$HQ1=HQ2(1-1/COP) \quad (6)$$

The coefficient of performance COP is presented by the expression (7) below in which ET is the temperature of the refrigerant entering the compressor 52 (the primary temperature) (° C.), CT is the temperature of the refrigerant discharged from the compressor 52 (the secondary temperature) (° C.), and η is the efficiency of the compressor 52.

$$COP=(CT+273.15)/(CT-ET)\times\eta \quad (7)$$

The efficiency η of the compressor 52 is constant and approximately 0.6. Then, the heat quantity HQ1 the heat exchanger 41 needs can be obtained from, as presented by the expression (8) below, the heat quantity HQ2 used by the indoor unit 40 for supplying hot water and the primary temperature ET and secondary temperature CT of the compressor 52.

$$HQ1=HQ2[1-1/\{(CT+273.15)/(CT-ET)\times\eta\}] \quad (8)$$

Then, the control device 401 obtains the primary temperature ET based on the output from the pressure sensor 406 and the secondary temperature CT based on the output from the pressure sensor 407. Subsequently, the control device 401 substitutes the calculated temperatures ET and CT and the heat quantity HQ2 used by the indoor unit 40 for supplying hot water in the above expression (8) to obtain the heat quantity HQ1 the heat exchanger 41 needs. Then, the control device 401 notifies the control device 201 of a requested quantity Q (n) on the refrigerant of the primary refrigerating cycle that is defined by the obtained heat quantity HQ1 in response to request from the control device 201 of the outdoor unit 20.

Thus, the control device 201 supplies a desired requested quantity Q (n) of refrigerant to the indoor unit 40.

As described above, in this embodiment, the primary temperature ET and secondary temperature CT of the compressor 52 are monitored to obtain the heat quantity HQ1 the heat exchanger 41 needs on a real time basis, and then obtain a requested quantity Q (n) on the refrigerant of the primary refrigerating cycle that is defined by the heat quantity HQ1. Thus, the heat quantity to request for the first refrigerating cycle can be obtained without calculating input to the compressor 52 even if the operation state of the secondary refrigerating cycle of the indoor unit 40 changes. Then, the refrigerant distributed by the outdoor unit 20 can be adjusted according to the operation state.

Consequently, it is possible to reduce the loss caused by the refrigerant being excessively supplied from the outdoor unit 20 to the indoor unit 40 and, for example, the compressor being repeatedly started and stopped. Then, it is possible to reduce the energy consumption of the system and operate the system efficiently.

In the above embodiment, the heat quantity to request for the first refrigerating cycle is obtained based on the output from the pressure sensors 406 and 407. However, as presented by the expression (5), if the input to the compressor 52 is known, the heat quantity to request for the first refrigerating cycle can be obtained. Then, it is possible to calculate the input to the compressor 52 and obtain the heat quantity to request for the first refrigerating cycle using the measurement results. Also in such a case, it is possible to adjust the refrigerant distributed by the outdoor unit 20 according to the operation state.

Consequently, it is possible to reduce the loss caused by the refrigerant being excessively supplied from the outdoor unit 20 to the indoor unit 40 and, for example, the compressor being repeatedly started and stopped. Then, it is possible to reduce the energy consumption of the system and operate the system efficiently.

Embodiments of the present disclosure are described above. However, the present disclosure is not confined to the above embodiments. For example, in the above embodiments, the heat exchanger 23 of the outdoor unit 20 has a fixed capability. This is not restrictive. Some procedure to improve the cooling efficiency of the refrigerant may be implemented when the total of the requested quantities Q from the indoor units surpasses the maximum quantity QM of the refrigerant discharged from the compressor 21. As such a procedure, it is possible to improve the heat conductance expressed by the product of the heat transfer area and heat transfer rate at the outdoor unit and indoor units. More specifically, it is possible to increase the output of the fans of the heat exchangers of the units.

Figure 8:
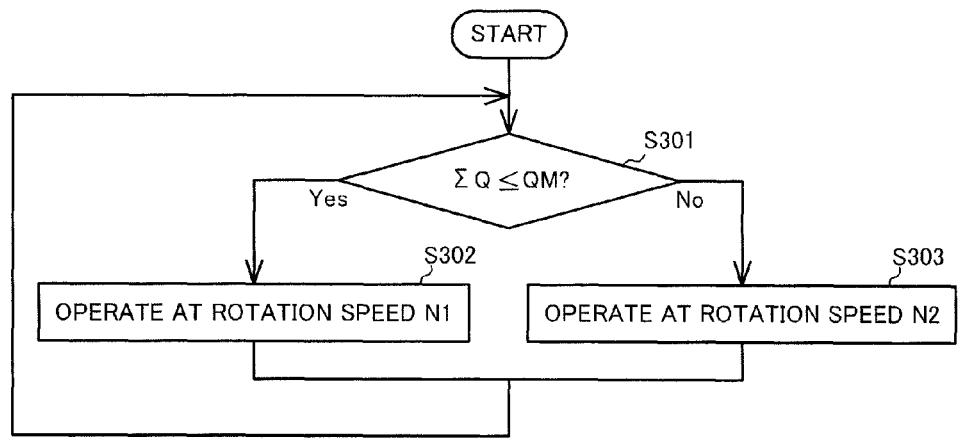
FIG. 8 is a flowchart showing a series of processing executed by the control device.

For example, FIG. 8 is an illustration showing an exemplary procedure executed by the control device 201 of the outdoor unit 20. As the heat pump system 10 is activated, the outdoor unit 20 compares the total quantity ΣQ of the requested refrigerant quantities Q from the indoor units 30A to 30C and 40 with the maximum quantity QM of the compressor 21 (Step S301). If the total quantity ΣQ is equal to or smaller than the maximum quantity QM of the compressor 21 (Step S302: Yes), the control device 201 operates the fan of the heat exchanger 23 at a rotation speed N1. On the other hand, if the total quantity ΣQ is larger than the maximum quantity QM of the compressor 21 (Step S302: No), the control device 201 operates the fan of the heat exchanger 23 at a rotation speed N2 that is higher than the rotation speed N1.

In this way, when the total quantity ΣQ of the requested refrigerant quantities Q surpasses the maximum quantity QM of the compressor 21, the output of the outdoor unit 20 is increased compared with before.

In the above embodiments, chlorofluorocarbon R410A is used as the refrigerant circulating the primary refrigerating cycle and chlorofluorocarbon R134a is used as the refrigerant circulating the secondary refrigerating cycle. This is not restrictive and, for example, natural refrigerants such as carbon dioxide ($CO_2$), hydrocarbon, and helium, chlorine-free refrigerants such as R407C, R404A, HFO1234yf, and HFO1234ze, or fluorocarbon refrigerants such as R22 used in existing products can be used.

Furthermore, the refrigerant used in the primary refrigerating system and the refrigerant used in the secondary refrigerating system can be of the same kind or of different kinds. The refrigerants of the primary refrigerating cycle and secondary refrigerating cycle do not mix with each other during heat exchange.

When a refrigerant having a low critical temperature is used as the refrigerant of the secondary refrigerating cycle, the refrigerant of the secondary refrigerating cycle may reach a supercritical state during heat exchange in the heat exchanger 51. However, generally, when a refrigerant that is releasing heat is in a supercritical state, change in the heat exchanger pressure and heat exchanger exit temperature causes the COP to fluctuate more. Therefore, more advanced control is required in order to operate at a higher COP. On the other hand, a refrigerant having a low critical temperature generally has a high saturated pressure. Therefore, the pipes and compressors must be made stronger, causing the device cost to increase.

Furthermore, in order to prevent proliferation of bacteria such as *Legionella* in the tap water, it is recommended that the temperature of hot water to supply is 60° C. or higher. Then, it is desirable that the target temperature of hot water to supply is at least 60° C. or higher. In consideration of this matter, it is desirable that the refrigerant of the secondary refrigerating cycle is a refrigerant having a critical temperature of 60° C. or higher. Using such a refrigerant as the refrigerant of the secondary refrigerating cycle, presumably, a stably high COP can be obtained at low cost.

The functions of the outdoor control unit 120 and indoor control units 130A to 130C and 140 according to the above embodiments can be realized by dedicated hardware or a conventional computer system.

The programs stored in the auxiliary storage 201c of the control device 201 in the above embodiments can be stored and distributed on a computer-readable recording medium such as a flexible disc, CD-ROM (compact disk read-only memory), DVD (digital versatile disk, and MO (magneto-optical disk), and installed on a computer or the like to configure a device executing the above-described procedures. Furthermore, the programs can be stored in a disc device or the like of a given server unit on a communication network such as the Internet and, for example, superimposed on a carrier wave and downloaded.

In the above embodiments, the control device 201 of the outdoor unit 20 executes the series of processing shown in FIG. 5. This is not restrictive. It is possible to use an independent control device shared by the outdoor unit and indoor units to control the compressor 21 and four-way valve 22 of the outdoor unit 20 and to control the expansion valves 32, 42, and 53 of the indoor units 30A to 30C and 40. Furthermore, the processing executed by the control device 201 of the outdoor unit 20 can be executed by the control devices 301 and 401 of the indoor units 30A to 30C and 40.

Various embodiments and modifications are available to the present disclosure without departing from the broad sense of spirit and scope of the present disclosure. The above-described embodiments are given for explaining the present disclosure and do not confine the scope of the present disclosure. In other words, the scope of the present disclosure is set forth by the scope of claims, not by the above-described embodiments. Various modifications made within the scope of claims and scope of significance of the invention equivalent thereto are considered to fall under the scope of the present disclosure.

INDUSTRIAL APPLICABILITY

The heat pump system, control device, temperature adjustment method, and program of the present disclosure are suitable for adjusting the temperature of a temperature adjustment target.

REFERENCE SIGNS LIST 10, 11 Heat pump system
20 Outdoor unit
21 Compressor
22 Four-way valve
23 Heat exchanger
24, 25 Joint
26 Refrigerant pipe
30A to 30C Indoor unit
31 Heat exchanger
32 Expansion valve
33 Joint
34 Joint
35 Refrigerant pipe
40 Indoor unit
41, 51 Heat exchanger
42, 53 Expansion valve
43, 44 Joint
47 Refrigerant pipe
50 Circulating system
50a, 50b Refrigerant pipe
52 Compressor
57 Refrigerant pipe
60 Water supply pump
61 Water pipe
100 Office building
120 Outdoor control unit
130A to 130C, 140 Indoor control unit
201 Control device
201a CPU
201b Main storage
201c Auxiliary storage
201d Interface
201e Bus
202 Drive device
301 Control device
302 Inputter
303 Temperature sensor
304 Valve drive circuit
401 Control device
402 Inputter
403 Temperature sensor
404 Valve drive circuit
405 Drive device
406, 407 Pressure sensor
A1 to A3 Work space
B1 Kitchen
R1 to R4 Degree of opening

The invention claimed is:

1. A heat pump system, comprising:
multiple indoor units conducting heat exchange between a temperature adjustment target and a refrigerant;
an outdoor unit conducting heat exchange between the outdoor air and the refrigerant;
a first circulating system circulating the refrigerant between the multiple indoor units and the outdoor unit;
an adjuster provided to each of the indoor units for adjusting flow rates of refrigerant entering the indoor units from the first circulating system;
an inputter for entering a priority order for the indoor units; and
a controller controlling the adjuster and distributing the refrigerant so as to supply the indoor units with the refrigerant at flow rates the indoor units need based on the priority order of the indoor units from a highest priority when the total of refrigerant flow rates necessary at the multiple indoor units surpasses a maximum refrigerant flow rate that can be discharged into the first circulating system from the outdoor unit,
wherein the indoor units comprise:
a second circulating system circulating a refrigerant undergoing heat exchange with the refrigerant circulating in the first circulating system;
a compressor circulating the refrigerant of the second circulating system;
a first heat exchanger conducting heat exchange between the refrigerant of the first circulating system and the refrigerant of the second circulating system to function as the vaporization heat source of the second circulating system; and
a calculator calculating a requested heat quantity for the outdoor unit, the requested heat quantity being defined by a heat quantity necessary at the first heat exchanger obtained based on a primary temperature of the refrigerant entering the compressor and a secondary temperature of the refrigerant discharging from the compressor.

2. The heat pump system according to claim 1, wherein the controller distributes the refrigerant in accordance with the ratio of the refrigerant flow rates requested by the indoor units.

3. The heat pump system according to claim 1, wherein the controller controls the adjuster so that the indoor units having the highest priority are supplied with the refrigerant of the flow rates requested by those indoor units.

4. The heat pump system according to claim 3, wherein the controller distributes the remaining refrigerant after supplying the indoor units having the highest priority with the refrigerant of the flow rates requested by those indoor unit; to the other indoor units.

5. The heat pump system according to claim 4, wherein the remaining refrigerant is distributed in accordance with the ratio requested e other indoor units.

6. The heat pump system according to claim 1, wherein the first circulating system increases the heat quantity of refrigerant discharged from the outdoor unit when the total of the refrigerant flow rates requested by the multiple indoor units surpasses the maximum flow rate of refrigerant discharged from the outdoor unit compared with when the total of the refrigerant flow rates requested by the multiple indoor units is equal to or lower than the maximum flow rate of refrigerant discharged from the outdoor unit.

7. The heat pump system according to claim 1, wherein the calculator calculates the requested heat quantity using the heat quantity necessary at the first heat exchanger and input to the compressor.

8. The heat pump system according to claim 1, wherein the calculator calculates the requested heat quantity using the heat quantity necessary at the first heat exchanger and the coefficient of performance of the compressor.

9. The heat pump system according to claim 1, wherein the indoor units comprise a second heat exchanger conducting heat exchange between the refrigerant circulating the second circulating system and the water running through a hot-water supply system as a temperature adjustment target, wherein the refrigerant circulating the second circulating system has a critical temperature of 60° C. or higher.

10. A control device, comprising:

an obtaining section obtaining refrigerant flow rates necessary at multiple indoor units;

a calculating section calculating a total quantity of the refrigerant flow rates necessary at the indoor units; and a controlling section controlling a distributor of the indoor units so as to supply the indoor units with the refrigerant at flow rates the indoor units need based on priority order given to the indoor units from a highest priority when the total quantity surpasses the refrigerant quantity discharged from an outdoor unit to the first circulating system circulating the refrigerant between the indoor units and the outdoor unit, wherein the indoor units comprise:

a second circulating system circulating a refrigerant undergoing heat exchange with the refrigerant circulating in the first circulating system;

a compressor circulating the refrigerant of the second circulating system;

a first heat exchanger conducting heat exchange between the refrigerant of the first circulating system and the refrigerant of the second circulating system to function as the vaporization heat source of the second circulating system; and a calculator calculating a requested heat quantity for the outdoor unit, the requested heat quantity being defined by a heat quantity necessary at the first heat exchanger obtained based on a primary temperature of the refrigerant entering the compressor and a secondary temperature of the refrigerant discharging from the compressor.

11. A temperature adjustment method implemented with instructions stored in memory of a controller having at least one processor, where the instructions, when executed by the processor, perform the steps method, comprising:

a step of an obtaining section obtaining refrigerant flow rates necessary at multiple indoor units;

a step of a calculating section calculating a total quantity of the refrigerant flow rates necessary at the indoor units; and a step of a controlling section distributing the refrigerant to the indoor units so as to supply the indoor units with the refrigerant at flow rates the indoor units need based on a priority order given to the indoor units from a highest priority when the total quantity surpasses the refrigerant quantity discharged from an outdoor unit to the first circulating system circulating the refrigerant between the indoor units and the outdoor unit, the indoor units comprising a second circulating system circulating a refrigerant undergoing heat exchange with the refrigerant circulating in the first circulating system and a compressor circulating the refrigerant of the second circulating system;

a step of a first heat exchanger included with each indoor unit for conducting heat exchange between the refrigerant of the first circulating system and the refrigerant of the second circulating system to function as the vaporization heat source of the second circulating system; and a step of a calculator included with each indoor unit for calculating a requested heat quantity for the outdoor unit, the requested heat quantity being defined by a heat quantity necessary at the first heat exchanger obtained based on a primary temperature of the refrigerant entering the compressor and a secondary temperature of the refrigerant discharging from the compressor.

12. A non-transitory computer-readable information recording medium having recorded therein a program allowing a computer to execute:

a procedure to obtain refrigerant flow rates necessary at multiple indoor units;

a procedure to calculate a total quantity of the refrigerant flow rates necessary at the indoor units;

a procedure to control a distributor of the indoor units so as to supply the indoor units with the refrigerant at flow rates the indoor units need based on a priority order given to the indoor units from a highest priority when the total quantity surpasses the refrigerant quantity discharged from the outdoor unit to the first circulating system circulating the refrigerant between the indoor units and an outdoor unit, the indoor units comprising a second circulating system circulating a refrigerant undergoing heat exchange with the refrigerant circulating in the first circulating system and a compressor circulating in the refrigerant of the second circulating system;

a procedure performed by a first heat exchanger included with each indoor unit, to conduct first heat exchange between the refrigerant of the first circulating system and the refrigerant of the second circulating system to function as the vaporization heat source of the second circulating system; and a procedure performed by a calculator included with each indoor unit, to calculate a requested heat quantity for the outdoor unit, the requested heat quantity being defined by a heat quantity necessary at the first heat exchanger obtained based on a primary temperature of the refrigerant entering the compressor and a secondary temperature of the refrigerant discharging from the compressor.

* * * * *